Patented Feb. 25, 1947

2,416,607

UNITED STATES PATENT OFFICE 2,416,607

METHOD OF PREPARING FLUOROACETAMIDE

Jack C. Bacon, Stamford, Conn., assignor to American Cyanamid Company, New York, N. Y., a corporation of Maine No Drawing. Application January 19, 1945, Serial No. 573,642

5 Claims. (Cl. 260—561)

The present invention relates to a method of preparing fluoroacetamide, a compound useful as an intermediate and which possesses outstanding insecticidal toxicity when used either as a contact material or as a stomach poison.

It has been dscovered that fluoroacetamide may be readily produced by heating together potassium fluoride and a member of the group consisting of ammonium sulfato-acetamide and potassium sulfato-acetamide at a temperature within the range of from about 100° to 250° C., and preferably between 130° and 180° C.

The reaction, for example, between ammonium sulfato-acetamide and potassium fluoride to produce fluoroacetamide, may be illustrated as follows:

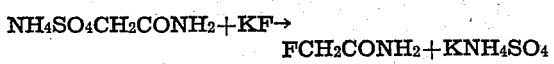

$$NH_4SO_4CH_2CONH_2 + KF \rightarrow FCH_2CONH_2 + KNH_4SO_4$$

In carrying out the process, the sulfato-acetamide and potassium fluoride are thoroughly mixed together before applying heat, preferably in the proportion of about 1 mol of the sulfato-acetamide to 2 mols of the potassium fluoride. The mixture is then heated, preferably under reduced pressure, in a reaction vessel so arranged that the fluoroacetamide as it is formed may be removed from the reaction zone and collected in an air-cooled condenser.

The following examples, in which the parts are by weight, further illustrate the invention:

Example 1

Glycolonitrile, 114 parts, was added slowly to 250 parts of sulfuric acid (100%) with stirring and cooling to keep the temperature of the mixture from rising above 60° C. Stirring was continued for about fifteen minutes after the addition of the nitrile was complete. The mixture was poured into aqueous ammonia with stirring and cooling, sufficient ammonia being used to make the resulting solution slightly basic. Upon cooling and filtering 180 parts of ammonium sulfato-acetamide, a white crystalline material, were obtained.

116 parts of potassium fluoride and 180 parts of ammonium sulfato-acetamide were mixed together in a ball mill for about three hours. The mixture was then heated in a distillation flask at a pressure of about 20 mm. during a period of 2½ hours. Distillation took place when the temperature of the mixture reached 140° C. The product was collected in an air-cooled condenser. The temperature was raised to about 200° C. during the last half hour of the run. 29 parts of a white crystalline product were collected, which, upon recrystallization from ethanol, gave 20 parts of fluoroacetamide.

Example 2

The procedure of Example 1 was repeated, using a mixture of 100 parts of potassium fluoride and 100 parts of potassium sulfato-acetamide. The temperature of the reaction mixture was raised to about 250° C. during the last half hour of the run. Fluoroacetamide was collected in the condenser as before.

Fluoroacetamide is a white crystalline substance melting at 108° C. It is soluble in water, ethanol and acetone, and slightly soluble in chloroform.

While the invention has been described with particular reference to specific embodiments, it is to be understood that it is not to be limited thereto but is to be construed broadly and restricted solely by the scope of the appended claims.

I claim:

1. A method of producing fluoroacetamide which includes the step of heating a mixture of potassium fluoride and a member of the group consisting of ammonium sulfato-acetamide and potassium sulfato-acetamide to a reaction temperature.

2. The method of claim 1 in which the mixture is heated at a temperature within the range of from about 100° to 250° C.

3. The method of claim 1 in which the mixture consists of potassium fluoride and the sulfato-acetamide in the proportion of about 2 mols of the former to 1 mol of the latter.

4. A method of producing fluoroacetamide which includes the steps of heating together potassium fluoride and a member of the group consisting of ammonium sulfato-acetamide and potassium sulfato-acetamide at a temperature within the range of 130° to 180° C., and recovering the fluoroacetamide from the reaction mixture.

5. The method of claim 4 in which the fluoroacetamide is recovered from the reaction through condensation of the vapors therefrom.

JACK C. BACON.